Fig. I.

April 23, 1957 A. S. TAYLOR ET AL 2,789,679
VIAL FEEDING MACHINE
Filed June 22, 1954 3 Sheets-Sheet 3

INVENTORS
Arthur S. Taylor
Ellsworth R. Sandhage

BY Alexander T. Kardos
ATTORNEY

United States Patent Office 2,789,679
Patented Apr. 23, 1957

2,789,679

VIAL FEEDING MACHINE

Arthur S. Taylor, Spring Valley, and Ellsworth R. Sandhage, Pearl River, N. Y., assignors to American Cyanamid Company, New York, N. Y., a corporation of Maine Application June 22, 1954, Serial No. 438,541

6 Claims. (Cl. 198—19)

The present invention relates to mechanism for indexing articles carried on a travelling conveyor and more particularly is concerned with mechanism for accurately stopping and positioning said articles individually at a predetermined location on a continuously travelling conveyor for sufficient time to have a desired operation performed thereat and then indexing and carrying the articles beyond that operating location.

Automatic mechanism has hitherto been used in industry to move a plurality of articles on a continuously travelling conveyor to a predetermined location, then individually position them thereat for some operating function to be carried out, and finally index them by means of a Geneva motion and star wheel and move the articles individually beyond that predetermined location. For example, containers have been carried on continuously-moving conveyors to various operating stations where they were individually momentarily halted and filled or treated, capped or sealed, labeled or marked, or the like, prior to being indexed individually and advanced in spaced relationship beyond the operating station. These containers normally were glass, plastic, metallic, or the like, and in any one particular application, have had substantially the same shape and size. Consequently, as long as that particular container was being used, there was no problem as to the applicability or the adaptability of the feeding and indexing means to the particular article being handled.

However, when it was desired to use a differently-shaped article in the operation, the mechanism, being of a single-use utility, had to be adjusted or modified to conform to the shape and size of the article being used. Such adjustments have not been too satisfactory in the past, having occasionally required rather skilled workmanship to make the change, and frequently have created considerable "down-time" while the machine was idle during the modification thereof. Additionally, a large number of positioning fixtures and holding plates were required, normally at least one for each individual type of article being processed, whereby machinery and equipment costs were undesirably increased.

It is therefore a principal object of the present invention to provide an article-indexing mechanism of simple construction but of universal use, applicable to articles of different shapes and sizes, round, square, rectangular, oval, etc., by means of an easily regulatable positioning and indexing device.

An advantage of the mechanism of the present invention is the avoidance of skilled workmanship required for such change and the decrease in the number of changeable parts required therein, as well as the reduction of the "down-time" involved, due to the facility and rapidity with which the universal indexing device can be converted even by relatively unskilled operators, or set-up personnel, to accommodate different shapes and sizes of articles.

Other objects and advantages will appear from a consideration of the following description and accompanying drawings wherein is described and illustrated a preferred design of machine embodying the principles of the present invention. It is to be understood, however, that the inventive concept is not to be limited to the particular construction disclosed except as determined by the scope of the appended claims.

With reference to the accompanying drawings.

Figure 1:
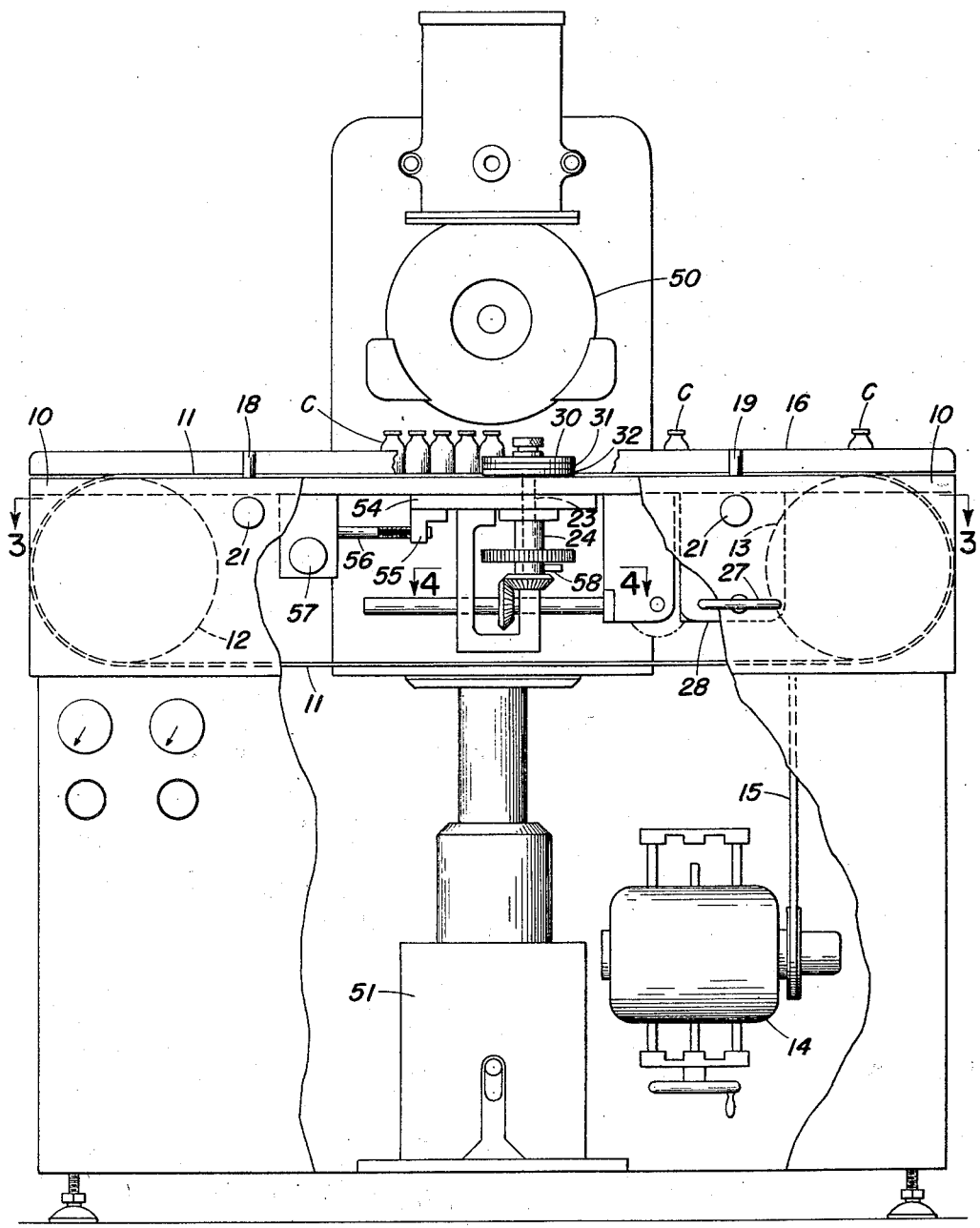
Figure 1 is a view in elevation, partially cut-away, of a machine embodying the improvements of the present invention.

In the preferred embodiment of the invention shown in the drawings, the mechanism comprises an operating table or top sheet 10, the upper surface of which supports the upper reach of a conveyor in the form of an endless belt 11. The belt 11 is trained and properly tensioned over adjustable driving pulleys 12 and 13 and may be continuously driven thereby at a desired speed, with the upper reach of the belt moving from left to right, as viewed in Figure 1. A motor 14, suitable driving connections such as pulley belt 15 and associated mechanism may be provided to drive the pulleys 12 and 13, as desired.

Figure 2:
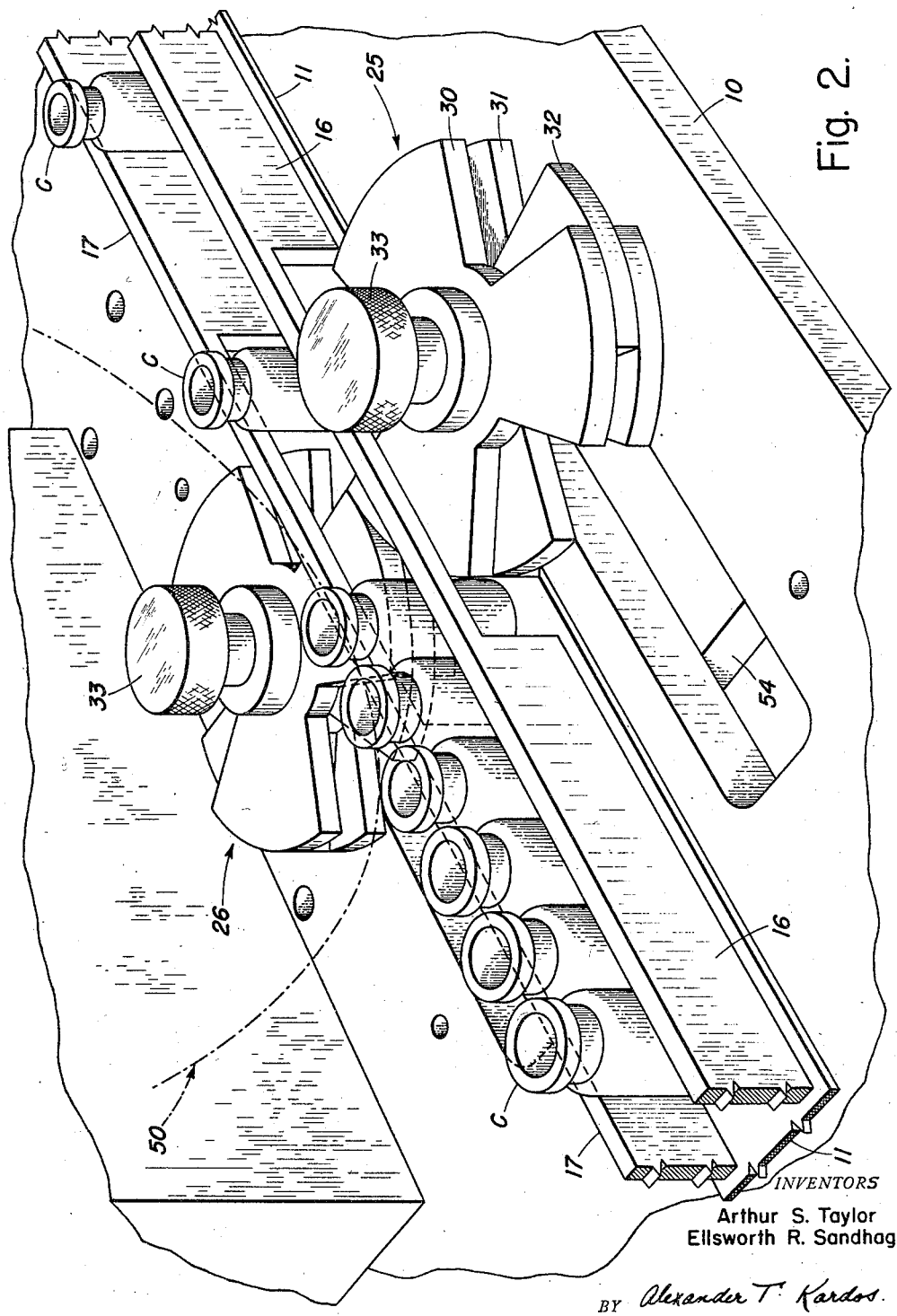
Figure 2 is a fragmentary perspective view, showing in detail the indexing means of the present invention.
Figure 3:
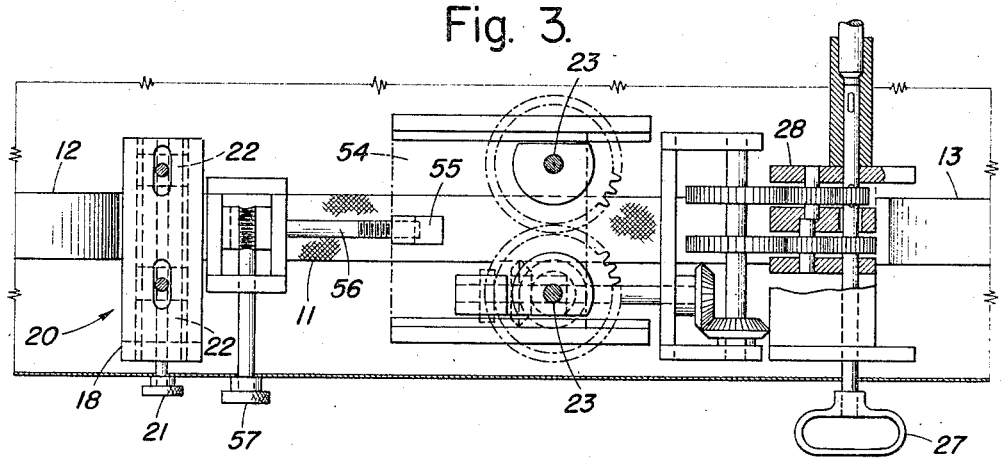
Figure 3 is a cross-sectional plan view, taken on the line 3—3 of Figure 1, showing details of the guide-adjusting and the actuating and driving mechanism.

A pair of laterally adjustable guide-walls 16 and 17 are provided adjacent and immediately above the belt 11, as shown in Figure 2, and are so mounted upon slidably adjustable brackets 18 and 19 as to be clear of the conveyor belt and movable toward or away from each other at right angles to the direction of movement of the belt 11 as to change the spacing of the guides and to permit the positioning therebetween of containers C of various sizes. In Figure 3 is disclosed a right-and-left hand screw-type sliding-block mechanism 20 operable by means of a control knob 21 whereby the sliding blocks 22, 22 upon which are mounted the adjustable guides 16 and 17 are simultaneously moved inwardly and outwardly to space the guides accordingly.

In the preferred embodiment, the container C is shown as a container or vial but such is employed primarily as illustrative of a particular use of the mechanism and is not to be construed as limitative thereof, inasmuch as the mechanism may be used with bottles, jars, cans or other receptacles and articles having a wide range of shapes, sizes and cross-sections.

As shown in Figure 2, a pair of holding and metering devices 25 and 26 are mounted on the operating table and are employed to momentarily stop the advancing line of containers C on the continuously-moving conveyor 11 with the foremost container in a designated station or location; to hold that container momentarily stationary thereat for a specified time, and then to meter and advance it therethrough and beyond the designated location, while the conveyor automatically advances the line of containers until another container is stopped in the foremost position.

The metering or indexing devices 25 and 26 are alike, although mirror images of each other, and the following discussion will refer to the construction of index 25, although it must be remembered that index 26 has similar parts, although sometimes of opposite hand.

Figure 8:
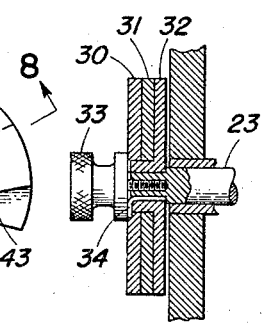
Figure 8 is a cross-sectional view of the indexing device of the present invention, taken on the line 8—8 of Figure 5, 6 or 7.

As shown more clearly in Figures 1 and 8, a rotating shaft comprising a centrally located solid shaft 23 and a concentrically located hollow shaft 24 is continuously driven by motor 14 through belt 15 and suitable speed-reduction gearing 28 operable by means of control knob 27. Shaft 23 has mounted thereon a plurality of concentric, sectored circular plates 30, 31 and 32 so as to be rotatable therewith. The upper and lower sectored plates 30 and 32 are keyed to the shaft 23 by key 34 and are positively rotated therewith, whereas the middle sectored plate 31 is adapted to be compressed between upper and lower plates 30 and 32 in any angularly adjustable position desired and to be frictionally rotated therewith. A knurled thumbscrew 33 is provided to apply the necessary pressure to hold the sectored plates frictionally together.

Consideration of Figure 2 will reveal that, as the containers C are moved forwardly on the belt 11, they are stopped to form a row when the foremost container abuts the uninterrupted portion of the periphery of the combined circumferences of the sectored plates 30, 31 and 32. The belt 11 is continuously driven and consequently it will continue forwardly and will slide under the stationary row of containers and exert a sufficient dragging frictional force to keep the foremost container pressed positively and firmly against the combined periphery of the plates 30, 31 and 32.

As these sectored plates continue to rotate, the sectored portions of the plates, that is, that part from which a sector-like portion has been removed, finally comes around and receives the foremost container therein, moves it forwardly through the indexing device, and then discharges it to be carried onwardly in spaced relationship on the conveyor belt 11.

If merely a single sectored plate had been employed on the rotating shaft 23, the container-receiving space would have been fixed and would have required changing of plates and adjustment thereof each time a differently shaped container was used. Consequently, an infinite number of plates would have been required to accommodate containers of varying shapes and sizes.

In the present invention, however, a plurality of such sectored plates is employed whereby a simple angular rotation to bring the plates into or out of register, as regards their sectors, serves to create a different article-receiving space ranging from a negligible space to the full size of the combined sectors to accommodate substantially any shape or size of container. In other words, if the sectors of two concentric circular plates are in register with each other, the article-receiving space is equal to the size of the sector. However, if the concentric plates are rotated out of register, then the article-receiving space is reduced correspondingly.

Three sectored plates are shown in Figures 1 and 2 wherein the upper and lower plates are keyed into register and the middle plate is adjustable whereby the article is contacted at two points by the upper and lower plates, respectively, and moved more positively and safely. Actually, merely a total of two plates would suffice for normal operations inasmuch as the plates are of sufficient width as to permit positive and safe movement of the articles by merely a one point contact by one plate.

Figure 5:
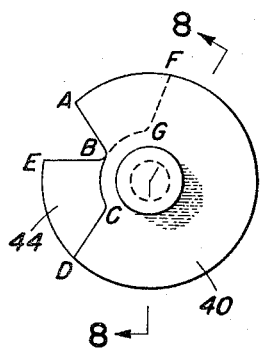
Figures 5, 6 and 7 show plan-view modifications of the indexing means.
Figure 6:
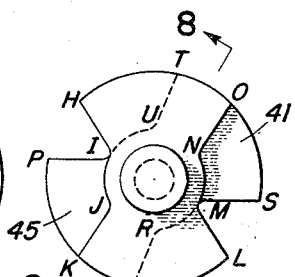
Figure 7:
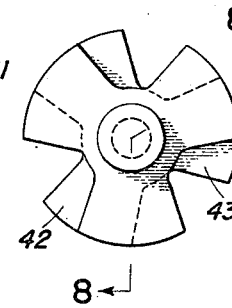

Reference to Figures 5, 6 and 7 will reveal the construction of several modifications of the sectored plates. Figure 5 shows an upper sectored plate 40 (ABCD) which has merely one sector ABCD removed therefrom whereby a single container-receiving space ABE is formed by cooperation with the second sectored plate 44 (EFGB). Such an arrangement of the plates will provide for the indexing and the advancement of one container for each revolution of the plates.

In Figure 6 is shown a pair of plates whereby two containers may be advanced separately and individually for each rotation of the plates. In this modification, upper sectored plate 41 (HIJKLMNO) cooperates with a second sectored plate 45 (PQRMSTU). It is to be noted that the two container-receiving spaces are identified as (PIH) and (LMS).

In Figure 7 is shown an arrangement whereby upper sectored plate 42 cooperates with a lower sectored plate 43 to form three container-receiving spaces in order that three containers be advanced for each rotation of the plates. Identifying letters have been omitted from this figure inasmuch as the construction is believed clear from the preceding description and since the use of such a large number of additional identifying letters would confuse the drawing.

It is to be appreciated that a third sectored plate may be utilized in each instance, such as shown in Figure 2, and that the upper and lower plates are normally in phase in such a case and act together like a pair of fingers in picking-off the next article.

It is to be noted that the sides of these sectors, such as, for example, sides AB and BE in sector ABE, are not exactly radii of the circular plate 4 due to the fact that if they were as long as radii, they could not be extended to the very center of the plate inasmuch as such would reduce the strength of the plate. Consequently, the sector ABE is not technically or accurately a sector and therefore it must be understood that the term "sector" as used in this specification, referes to a shape having generally the configuration of a sector.

The use of these different sectors may be described as follows: in the event that one filling or dosage is required for each container and the mono-sectored plate is used, the control knob 27 is used to regulate the gearing 28 to control the intermittent motion of the turret head to one advancing motion per rotation of the plate. If the di-sectored plate is used, one advancing motion of the turret is used for 180° of the plate and if the tri-sectored plate is used, one advancing motion of the turret is used for 120° of the plate.

If two fillings or dosages are required, then proper regulation and selection of the proper gearing 28 may be used to provide two advancing motions of the turret (and two fillings) for each sector of the plate. In a similar way, three dosages may be deposited in the container, if so desired. The gearing is, of course, a matter of mechanical expediency and the precise nature and form thereof does not enter into the essence of the invention and consequently has not been specifically described beyond the reference to the gear or speed reduction mechanism 28 and control 27.

The indexing devices 25 and 26 are illustrated in Figure 2 as acting in pairs by operating through slotted openings in the adjustable guide walls 16 and 17. It is to be appreciated, however, that the device would be operative with only one indexing device in which case the article being indexed would bear against a guide wall (preferably without a slotted opening therein) while the single indexing device is metering and advancing it.

The indexing mechanism of the present device may be very conveniently used in conjunction and synchronization with apparatus for measuring and filling powders volumetrically by means of an intermittently rotating filling head turret 50, such as is more specifically described in U. S. Patent 2,540,059 to F. E. Stirn et al., issued January 30, 1951. As disclosed in that patent, discharge means are provided at the very bottom of the filling head turret 50 to deposit a dose or a charge of material into a container positioned directly therebelow.

It will be obvious that, if a larger container were to be used, a greater clearance space must be provided between the belt 11 and the bottom of the filling head turret 50. Consequently, elevating or depressing means 51 (such as a hydraulic lift) is provided in order to raise or lower the filling head turret 50 and its auxiliaries in order that the mouth of the bottle be positioned relatively closely to the discharging means of the turret. By adjusting the filling head turret 50, in preference to adjusting the table 10, it becomes unnecessary to adjust the mechanisms feeding the containers to the table 10 and removing the containers therefrom.

In the same way, it is to be realized that if the mouth of the bottle is considerably wider, that the center thereof will be displaced rearwardly (or to the left as viewed in Figure 1). In order that the center of the bottle be located exactly in the right location directly below the discharge means of the turret 50, adjustable means is provided in order to move the entire holding and metering devices 25 and 26 to the right or to the left, as viewed in Figure 1.

The holding and metering devices 25 and 26 are mounted on a slidable base plate 54 having a hanger bracket 55 depending from the rear end thereof. A threaded hole is provided in the bracket 55 and a threaded shaft 56 is screwed thereinto and can be turned by adjusting knob 57 whereby the base plate 54 and the metering devices 25 and 26 mounted thereon may be moved to the right or to the left as viewed in Figure 1, whereby the center of the mouth of the bottle may be precisely and accurately positioned as desired. It is to be appreciated further that, although the preferred embodiment discloses the indexing plates substantially in contacting relationship, such is not necessarily so and the indexing plates may be separated to some extent but not that much as to permit an article to slip through without being stopped and indexed individually.

It may happen that occasionally an article or container is tipped or not properly positioned between the guides 16 and 17 and may be lying on its side whereby the indexing device may jam and put an end to normal operation of the mechanism. In order to prevent damage or breakage of parts or of the article itself, shafts 23 and 24, which are driven through suitable gearing by means of motor 14, are connected through the instrumentality of a ball clutch 58 arrangement whereby, if any undue resistance is experienced by the indexing plates, slippage of the indexing device and relative rotation of the shafts is permitted.

Figure 4:
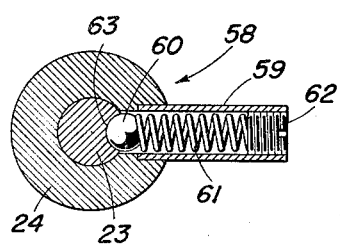
Figure 4 is a detail cross-sectional view, taken on the line 4—4 of Figure 1, showing details of the ball-clutch release mechanism.

As shown more clearly in Figure 4, the ball clutch 58 comprises a cylindrical housing 59 in which is mounted a ball 60 adjustably pressed inwardly and spring-loaded by a compression spring 61 and adjusting screw 62. The ball 60 fits within a detent 63 in the solid shaft 23 and, if resistance above a predetermined amount is encountered, slippage will be permitted by relative rotation of solid shaft 23 and hollow cylindrical shaft 24. As long as the excessive resistance is maintained at the indexing plates, the solid shaft 23 and the hollow shaft 24 will continue to slip whereby breakage and damage is avoided. It is to be observed that, as the shafts rotate relatively, the ball 60 is momentarily withdrawn from its socket-like detent 63 and rolls around on the periphery of rotating shaft 23. When one complete rotation has almost been completed and the ball 60 approaches the detent 63, it will suddenly snap back in to the detent 63 once it has reached the edge thereof. This causes a sudden back-motion of the indexing plates and normally any jammed bottle is thrown backwardly clear of the plates whereby jams are normally automatically freed and cleared without any action by the operator. In this way, a new and unusual cooperative effect is realized between the feeding means and the ball clutch release.

Figure 9:
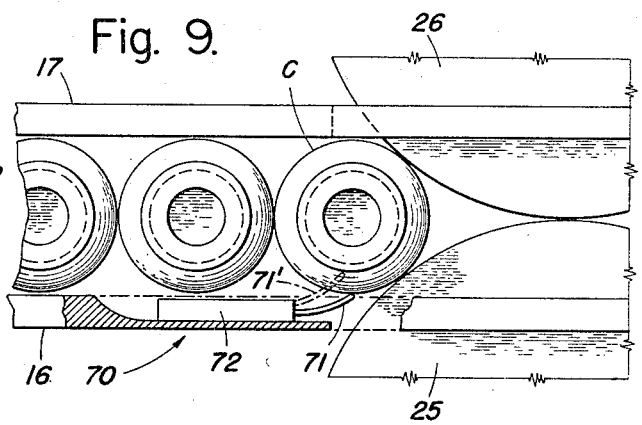
Figure 9 is a fragmentary cross-sectional view of a stop-motion mechanism used in conjunction with the indexing device of the present invention.

As shown in Figure 9, a stop-motion mechanism 70 may be provided to stop the operation in the event that a container is not positioned at the proper location contacting the uninterrupted peripheries of the plates of the indexing devices. Feeler 71 is provided and contacts the container to determine if it is properly positioned and, if it is so positioned, switch 72 will permit the continued operation of the mechanism. However, if feeler 71 does not contact a container at the proper position and is permitted to rise to its upper position 71', then switch 72 will open the electrical circuit and stop the mechanism of the entire device. Such a mechanism will prevent the wastage and spillage of materials from the filling head turret 50 whenever a bottle or container is not properly positioned to receive a charge therefrom.

Although the present invention has been described in combination with a particular type of filling mechanism, it is to be appreciated that such is primarily for illustrative purposes and is not to be construed as limitative of the inventive concept involved.

The indexing device may be used with other types of filling machines and with other types of operational devices.

The operation of the mechanism is as follows: Articles or containers C are fed either manually or automatically to the conveyor 11 between the adjustable guides 16 and 17 and are advanced thereby, normally in a row until the foremost article contacts the uninterrupted periphery of the sectored plates. The foremost or leading article is then positioned accurately and is held in that position as long as the periphery of these continuously rotating plates remains uninterrupted at the point of contact. During this time, the necessary or required operation of filling, treating, capping, sealing, labeling, etc., is performed. The combined cutaway sector of the plates then comes around and picks off this foremost article by receiving it within the article-receiving space and advances it past the indexing device and onwardly on the conveyor beyond that location. At the same time, the conveyor belt 11 which was sliding slowly underneath the row of articles advances the row until the next article abuts the uninterrupted periphery of the rotating plates and is held there momentarily in order to have a necessary operation performed thereon. When that operation has been completed, the timing is such that the next sector comes around at that time and picks off that particular article. The operation of the mechanism continues in this fashion as long as an article is properly positioned to receive the charge or to have the necessary operation performed thereon.

While we have shown here described what we believe to be a preferred embodiment of our invention in a nature of simplicity and durability of construction, ease of operation, etc., it will be observed that the terms of such construction will be more or less modified within the scope of the claims without departure from the principles of construction or material sacrifice of the advantages of the preferred device.

What we claim is:

1. In indexing mechanism of the character described, means to advance a plurality of articles toward an operating location and to carry said articles away from said operating location; means to guide said plurality of articles in a straight line as they are so advanced; a rotatable shaft; means to continuously rotate said shaft during normal operation; a sectored circular plate mounted on said shaft and rotating therewith; a second sectored circular plate mounted on and angularly adjustable about said shaft; and means to adjustably clamp said sectored plates in angularly rotated positions whereby the sectors jointly define an article-receiving space, said rotatable sectored circular plates being positioned adjacent said article-advancing and article-guiding means to stop and hold the foremost article of said plurality of articles during the time the uninterrupted peripheries of said plates contact the foremost article and then to advance the same when said article-receiving space is presented to said article to receive the same therein.

2. In indexing mechanism of the character described, means to advance a plurality of articles toward an operating location and to carry said articles away from said operating location; means to guide said plurality of articles in a straight line as they are so advanced; holding and indexing means at said operating location to hold said articles thereat for a sufficient time to carry out the operation and then to index and advance the articles past said operation location comprising a rotatable shaft; means to continuously rotate said shaft during normal operation; a pair of sectored circular plates mounted on said shaft and rotating therewith with their sectors in register; a third sectored circular plate mounted on and angularly adjustable about said shaft intermediate said pair of plates; and means to adjustably clamp said pair of sectored plates and said third plate in angularly rotated positions whereby the sectors jointly define an article-receiving space, said rotatable sectored circular plates being positioned adjacent said article-advancing and article-guiding means to stop and hold the foremost article of said plurality of articles during the time their uninterrupted peripheries contact the foremost article and then to receive and advance the same when said article-receiving space is presented to said article to receive the same therein.

3. In indexing mechanism of the character described, means to advance a plurality of articles toward an operating location and to carry said articles away from said operating location; means to guide said plurality of articles in a straight line as they are so advanced; holding and indexing means at said operating location to hold said articles thereat for a sufficient time to carry out the operation and then to index and advance the articles past said operating location comprising a pair of rotatable shafts, one located on each side of said article-advancing and article-guiding means; means to continuously rotate said shafts during normal operation; a pair of sectored circular plates mounted on each shaft and rotating therewith with their sectors in register; a sectored circular plate angularly adjustably mounted on each shaft intermediate said pair of plates; and means to adjustably clamp said pairs of sectored plates and said intermediate plates in angularly rotated positions whereby the sectors define article-receiving spaces; each of said pairs of rotatable sectored circular plates and intermediate plates being positioned adjacent said article-advancing and article-guiding means to stop and hold the foremost article of said plurality of articles during the time their uninterrupted peripheries contact the foremost article and then to receive and advance the same when their article-receiving spaces is presented to said article to receive the same therein.

4. In indexing mechanism of the character described, continuously moving conveyor means to advance a plurality of articles toward an operating location and to carry said articles away from said operating location; a pair of adjustable guide walls to conduct said plurality of articles in a straight line as they are so advanced; holding and indexing means at said operating location to hold said articles thereat for a sufficient time to carry out the operation and then to index and advance the articles past said operating location comprising a rotatable shaft, means to continuously rotate said shaft during normal operation, a pair of sectored circular plates mounted on said shaft and rotating therewith with their sectors in register; a third sectored circular plate mounted on and angularly adjustable about said shaft intermediate said pair of plates; and means to adjustably clamp said pair of sectored plates and said third plate in angularly rotated positions whereby the sectors jointly define an article-receiving space; said rotatable sectored circular plates being positioned adjacent said article-advancing means and protruding through an opening in said guide wall to stop and hold the foremost article of said plurality of articles during the time their uninterrupted peripheries contact the foremost article and then to receive and advance the same when said article-receiving space is presented to said article to receive the same therein.

5. In indexing mechanism of the character described, means to advance a plurality of articles toward an operating location and to carry said articles away from said operating location; means to guide said plurality of articles in a straight line as they are so advanced; a rotatable shaft; means to continuously rotate said shaft during normal operations; a sectored circular plate mounted on said shaft and rotating therewith; a second sectored circular plate mounted on and angularly adjustable about said shaft; means to adjustably clamp said sectored plates in angularly rotated positions whereby the sectors jointly define an article-receiving space, said rotatable sectored circular plates being positioned adjacent said article-advancing and article-guiding means to stop and hold the foremost article of said plurality of articles during the time their uninterrupted peripheries contact the foremost article and then to advance the same when said article-receiving space is presented to said article to receive the same therein; and stop-motion means to stop the operation of said indexing mechanism upon absence of said foremost article from its proper operating location.

6. In indexing mechanism of the character described, means to advance a plurality of articles toward an operating location and to carry said articles away from said operating location; means to guide said plurality of articles in a straight line as they are so advanced; a rotatable shaft; means to continuously rotate said shaft during normal operations; a sectored circular plate mounted on said shaft and rotating therewith; a second sectored circular plate mounted on and angularly adjustable about said shaft; means to adjustably clamp said sectored plates in angularly rotated positions whereby the sectors jointly define an article-receiving space, said rotatable sectored circular plates being positioned adjacent said article-advancing and article-guiding means to stop and hold the foremost article of said plurality of articles during the time their uninterrupted peripheries contact the foremost article and then to advance the same when said article-receiving space is presented to said article to receive the same therein; and damaging-preventing means to provide slippage of said means to rotate said shaft upon improper positioning of said foremost article, comprising a symmetrical detent and a spring loaded ball, said spring loading being such that the ball is forced into said detent just before assuming its normal drive position, thereby causing a reversal of torque on said shaft, and a jam-clearing back-motion of said sectored plates.

References Cited in the file of this patent
UNITED STATES PATENTS

| 1,470,348 | Clark | Oct. 9, 1923 |
| 2,503,864 | Carter | Apr. 11, 1950 |
| 2,524,248 | Albertoli | Oct. 3, 1950 |
| 2,599,220 | Bergmann | June 3, 1952 |